United States Patent
Newman et al.

(10) Patent No.: US 7,563,159 B2
(45) Date of Patent: Jul. 21, 2009

(54) AIRFLOW CONTROL IN HEATING AND AIR-CONDITIONING UNITS

(75) Inventors: David Newman, Lake Orion, MI (US); Richard Delplace, Livonia, MI (US); Steven Marshall, Oxford, MI (US)

(73) Assignee: Valeo Climate Control Corporation, Auburn Hills, MI (US)

( * ) Notice: Subject to any disclaimer, the term of this patent is extended or adjusted under 35 U.S.C. 154(b) by 0 days.

(21) Appl. No.: 11/004,364

(22) Filed: Dec. 3, 2004

(65) Prior Publication Data

US 2005/0159097 A1     Jul. 21, 2005

Related U.S. Application Data

(63) Continuation-in-part of application No. 10/729,456, filed on Dec. 5, 2003, now abandoned.

(51) Int. Cl.
*F28D 7/10* (2006.01)
*B60H 3/00* (2006.01)

(52) U.S. Cl. ........................ 454/156; 165/156
(58) Field of Classification Search ................ 454/156, 454/121
See application file for complete search history.

(56) References Cited

U.S. PATENT DOCUMENTS

| | | | |
|---|---|---|---|
| 4,577,836 A | 3/1986 | Guillemin | |
| 5,619,862 A | 4/1997 | Ruger et al. | |
| 5,676,595 A * | 10/1997 | Sumiya et al. | 454/121 |
| 5,988,263 A | 11/1999 | Schwarz | |
| 6,007,421 A | 12/1999 | Schwarz | |
| 6,520,850 B1 | 2/2003 | Buckman et al. | |
| 6,588,496 B2 | 7/2003 | Nakagawa et al. | |
| 6,668,909 B2 | 12/2003 | Vincent | |
| 2004/0016536 A1 * | 1/2004 | Auer et al. | 165/203 |

* cited by examiner

*Primary Examiner*—Steve McAllister
*Assistant Examiner*—Helena Kosanovic
(74) *Attorney, Agent, or Firm*—Dierker & Associates, P.C.

(57) ABSTRACT

A ventilating air and airflow control in a ventilating, heating or air conditioning system is provided. A structure and method to provide air flow mixture via an air mixer structure or 'baffle' located within a blend door are provided.

The simplified HVAC unit provides a baffle/blend door assembly comprising an air mixer structure wherein the attachment means of baffle and barrel door is such that it provides for ease of assembly. The baffle/barrel door assembly provides for smaller packaging volume with the same functionality as larger HVAC units.

13 Claims, 11 Drawing Sheets

AIRFLOW CONTROL IN HEATING AND AIR-CONDITIONING UNITS

This application is a continuation in part of Ser. No. 10/729,456 filed Dec. 5, 2003

FIELD OF THE INVENTION

The present invention relates generally to airflow control in heating and air conditioning units, particularly for automotive purposes.

BACKGROUND OF THE INVENTION

The present invention relates to the field of directing ventilating air and airflow control in a ventilating, heating or air conditioning system. More specifically, the present invention relates to a structure and method to provide air flow mixture via an air mixer structure located within a blend door.

DESCRIPTION OF THE PRIOR ART

In automotive ventilating systems and in ventilating systems in general, air needs to be directed to desired areas through respective air passageways. The air can be directed via outlet means such as dampers, doors and various mechanisms so the area that the ventilating system designer desires to have the air proceed to is achieved under any selected design conditions. For example, a design may provide for heated or cooled air to pass through an area or zone where it mixes to provide a certain temperature of air based on the area in the passenger compartment of a vehicle to which the air will be finally directed. Many HVAC architectures however, are flawed due to limitations in parts manufacture, tooling and assembly of said parts.

Ventilating, heating and air conditioning systems in modern vehicles strive to provide a total interior climate control. Such systems maintain a desired temperature by delivering an appropriate mix of ambient, cooled and heated air to the vehicle interior. Such systems conventionally include an air duct, which is selectively connected to the external air or to the interior of the vehicle cabin, a fan for causing the air to flow, and an evaporator unit within the duct for cooling the air. The cold air output from the evaporator unit may be supplied directly to various outlets within the vehicle cabin or some of the cold air may be passed through a heating heat exchanger whose heated air output is mixed with the cold air to provide temperature control of the air output to the cabin. Diversion of the cold air through the heat exchanger in some prior art is controlled by a so-called "blend door", which in one extreme position causes all of the cold air to flow through the heat exchanger and in the opposite extreme position causes none of the air to flow through the heat exchanger. In intermediate positions, different proportions of cold air and heated air can be provided. Blend doors (those that send air to the distribution areas prior to distribution and mode doors that take this air and direct it into the ducts for final distribution in automotive vehicles), can be of many shapes or types. One shape of door in HVAC units can be barrel type doors, i.e. doors that are shaped like a barrel and turn around a central axis to distribute air.

U.S. Application Publication 2004/0016536A1, Auer et al, Jan. 29, 2004 a simple blend door (34) without any air mixture structure of any kind in the unit, is described.

In the invention of U.S. Pat. No. 5,988,263, issued Nov. 23, 1999, Schwarz, an air flow mixer structure for a vehicle air conditioning system having a first conduit for a first air flow, a second conduit for a second air flow, an opening between said first and second conduits for merging said first and second air flows in a merging region and a common air channel for said merged air flows wherein the mixer structure is disposed in the first conduit for controlling the first air flow, the mixer structure having an air inlet region and an air outlet region opening into said merging region, the mixer structure comprising plural air passages disposed between said inlet region and said outlet region for dividing an air flow at said inlet region into plural air flows at plural said openings into said merging region is described. In FIG. 2 of U.S. Pat. No. 5,988,263 the air flow mixer structure is clearly located apart from the blend door feature, provided in a second duct in the air conditioning system, and not as an integrated assembly.

A further desired goal of such systems is to provide selected desired air mixing at the output of the flow mixture structure. The prior art, therefore, shows that to design a compact HVAC unit architecture, the positioning of the components is critical. These components are typically heater core, evaporator, blend door (s), panel (vent) door and floor door. In addition, as to the HVAC unit, itself prior to distribution through ducts and panel, defrost, or floor doors, prior art designs have had separate air mixing devices and blend door, positioned in series or in line one with another to achieve their desired air flow effects. This positioning leads to increased packaging space needs to achieve their desired end results.

A prior art HVAC system is shown in FIG. 1. The HVAC system's core module 12 and air distribution module 30. Ambient outside air or recirculated interior air is directed to air inlet 14 and is subsequently directed through air-conditioning evaporator 16 by the HVAC blower (not shown). After the air exits from evaporator 16 to pass between point 19 and wall 20, part of the air is directed through cool inlet area 22- and part of the air directed to warm air passage 24. Inlet 22 and passage 24 are variable in area depending upon the position of air mix door 18. Air mix door 18 is hinged at 17 to pivot there around and the position of air mix door 18 is directly related to the desired air temperature of air to be output to the interior of the vehicle. Thus, to obtain the maximum amount of cool air, air mix door 18 is rotated to maximize the amount of cool air inlet 22. If heated air is desired, air mix door 18 is rotated to create a warm air passage 24 thereby diverting a portion of the air flow exiting from evaporator 16 to flow through heater core 26 and duct the heated air through heated air inlet 28 An intermediate position of air mix door 18 facilitates a mixture of cool and hot air simultaneously entering air chamber 32 of air distribution module 30 to provide air at a desired temperature.

Air distribution module 30 typically has three designated outlets for delivering the conditioned air to different portions of the vehicle. These outlets are generally referred to as a defrost outlet 36 for delivering air to the interior surface of the windshield, vent outlet 40 for delivering air to the upper portion of the vehicle interior and a heater outlet 44 for delivering air to the foot wells of the vehicle interior. Valves 34, 38 and 42 are selectively positionable in closed, opened or intermediate positions to place the desired HVAC in the desired function. The HVAC system 10 is typically located in the center of the vehicle as are outlets 36, 40 and 44.

In the past, many HVAC systems have been devised wherein multiple chambers exist to provide heated and/or cooled air to different areas of the passenger compartment of the vehicle. A large housing space was thus needed in such systems. Typically, a control means has been used to regulate the positions of the outlet means, such as doors, to let air into mixing chambers where the desired air temperature for the different passenger compartment areas (for example, the front and rear passenger compartments) is achieved.

Doors are often used to allow air entry into multiple chambers, each chamber providing a certain temperature level of air for transport to its associated passenger compartment. This has meant that a front door and a separate 'rear' door, with appropriate air channeling mechanism, such as divided walls and the like, was needed to direct the desired temperature air to both the rear and front areas of the passenger compartment. The air flow mixer concept meant that air could reach the hot and cold flow already partially mixed or turbulated. This mixing means that when cold air stream confronts warm air stream, the air intermingles more readily than in traditional systems. However, in the prior art systems, the mixing required a certain amount of space to confront the 'mixed' and 'non-mixed' air.

As described above, customers demand designs with less and less space required, so modern vehicles packaging requires more and more integration of the architecture. However, designs, including designs with baffles or, in particularly cross flow baffles such as those described in U.S. Application 2003/0201046, Oct. 20, 2003, Perry et al describe, for example, a cross flow distribution door (see FIG. 7) separate from any blend door. In current designs, the general design is to have the simple and separate blend door due to the heretofore inability to provide designs with air mixing devices that provided the desired temperature and air mixes necessary in limited spaces before reaching, for example, air distribution areas and eventual distribution through ducts and panel, defrost or floor doors.

The present invention, therefore, solves the space problem while providing excellent volume and temperature of air conditioner in the system, by mounting an air mixer structure or 'baffle', and, in particular, a cross flow air mixer structure, allowing direction of or deflection of air flows prior to reaching the distribution area or, cross flow baffle inside a door as opposed to separate from the door as in the prior art, for automotive HVAC units. More specifically by locating the baffle inside the door (baffle/barrel door assembly) it reduces packaging space requirements, allows for the attachment of the baffle while allowing the door to function throughout its range of motion, and provides an easily manufacturable attachment means to locate or incorporate a baffle in a door, while providing for efficient mixing of air in the confined space of the HVAC unit.

Another problem with prior art barrel doors, however, is when they reach critical lengths (for example, when they have a length from point of attachment to point of attachment that that allows a significant amount of air to be directed into the distribution area at one time), they have problems due to increased flexibility. The prior art solution to this problem has been to place a shaft or other sort of similar bridging device to stop the wedges, i.e. the 'pizza' like shape of the barrel door, from flexing during assembly and to provide additional stiffness. The problem with such as shaft has often been that it resulted in unacceptable levels of turbulence off the shaft leading to undesirable noises and air flow degradation. Such shaft, additionally, are often not simple to mold, and thus, increase the complexity to manufacture of the door.

OBJECTS OF THE INVENTION

In view of the drawbacks and disadvantages identified in the prior art, it is an object of the present invention to provide a simpler and more reliable mechanism for both mixing and controlling air in HVAC unit. The present invention, particularly in its preferred embodiments, solves the problem of the need for both a separate door and separate air mixer structure or 'baffle' within the limited packaging space of modern HVAC units. By providing for a blend door, or, more preferably, a blend barrel door, incorporating or including an air mixer structure or baffle, the blend barrel door/baffle arrangement thereby occupying, essentially, the same space in the HVAC unit as the blend barrel alone. The present invention decreases the number of separate elements necessary to provide appropriate mixing of air, as well as simplifying, reducing the space requirements of, and reducing the overall cost of the system.

It is a further object of the present invention to improve the compression and torsion stiffness of a preferable barrel door without the use of a shaft or cross member (whether it be molded in or not).

It is also a further object of the present invention to have an improved assembly process for the blend doors and air mixing devices of HVAC units by aiding in the sealing function. By closability or sealing it is meant prevention of flow past a normally open space. If there is inappropriate sealing, unwanted airflow passes, as might occur where there are areas of undesired torsion or twist.

SUMMARY OF THE INVENTION

The present invention meets the above needs by providing an air distribution module for a vehicle heating, ventilation and air conditioning system wherein said module mixes hot and cold air streams in a small HVAC unit space, as well as directs the air in the HVAC unit for automotive use. The air of the airflow is mixed in the single chamber prior to distribution to the front and rear passenger areas of a vehicle interior. The air distribution module preferably further comprises an evaporator means and heater means, more preferably a evaporator or heat core or the like. Preferably, an air distribution module for a vehicle heating, ventilation and air conditioning system in accordance with the present invention comprises a housing; a heating means; a cooling or 'evaporator' means; a door; a baffle; a first conduit for a first air flow; a second conduit for a second air flow; an opening between said first and second conduits for merging said first and second airflows in a mixing region. Preferably the baffle is located within the door, forming a baffle/blend door assembly.

As stated above, preferably, the air mixer structure is located within the blend door, more preferably within a blend barrel door, when used in automotive HVAC units.

In a preferred mode of operation, the blend door, and, preferably the blend barrel door, would be located downstream of the heater core and evaporator and would move between air passages for hot air from the heater core and cold air from the evaporator. The axis of the door would be downstream of the passages that are blocked by the door. Located or incorporated within the blend door is an air mixer structure 'baffle'. The baffle would fit into or occupy space in the interior of the door, and, preferably, fit into the door in the space between the triangular sides of the barrel. The baffle may be attached or functionally fitted into the housing; preferably the baffle is attached to the housing by means of sliding into housing surfaces located downstream of the passages that are blocked by the door. Also preferred is an air distribution module for a vehicle heating, ventilation and air conditioning system in accordance with the present invention wherein the barrel door is essentially in the shape of a 'slice' of a hollow cylinder closed on both ends. The shape has open space between the triangular sides and fits into the open space that, in the past, was essentially not used for packaging other components. This invention presents a solution to this problem by mounting an air mixer structure (baffle), preferably a cross flow baffle, in the essentially unused space inside a barrel door. The functions of mixing the hot and cold air paths, performed by the baffle, and the directing of the mixed air, performed by the barrel door, are accomplished in much less packaging volume than if the two components were not located together or integrated.

In general, because the door must move through an arc to function and the sides of the door sweep through the area that would be required to mount an object inside the door, the present invention, with its baffle located within the barrel door, presents the advantage of not requiring as much packaging volume as is typically allowed in common HVAC architectures.

Overall, the present invention provides advantages over the prior art such as easier assembly; good sealing less torsion over-twist (i.e. poor sealing due to twist door twist or distorsion due to torque forms within the door in ability to mold geometric form); ease in manufacture; reduction of noise overall in the HVAC unit; use of a common 'door' (combining the air mixing plus air distribution means) by a common baffle/barrel door assembly; baffle in-door technology leading to further competitive advantage due to compactness in the HVAC design; and allowance of removal of additional material, such as 'shafts' and the like in typical barrel doors.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
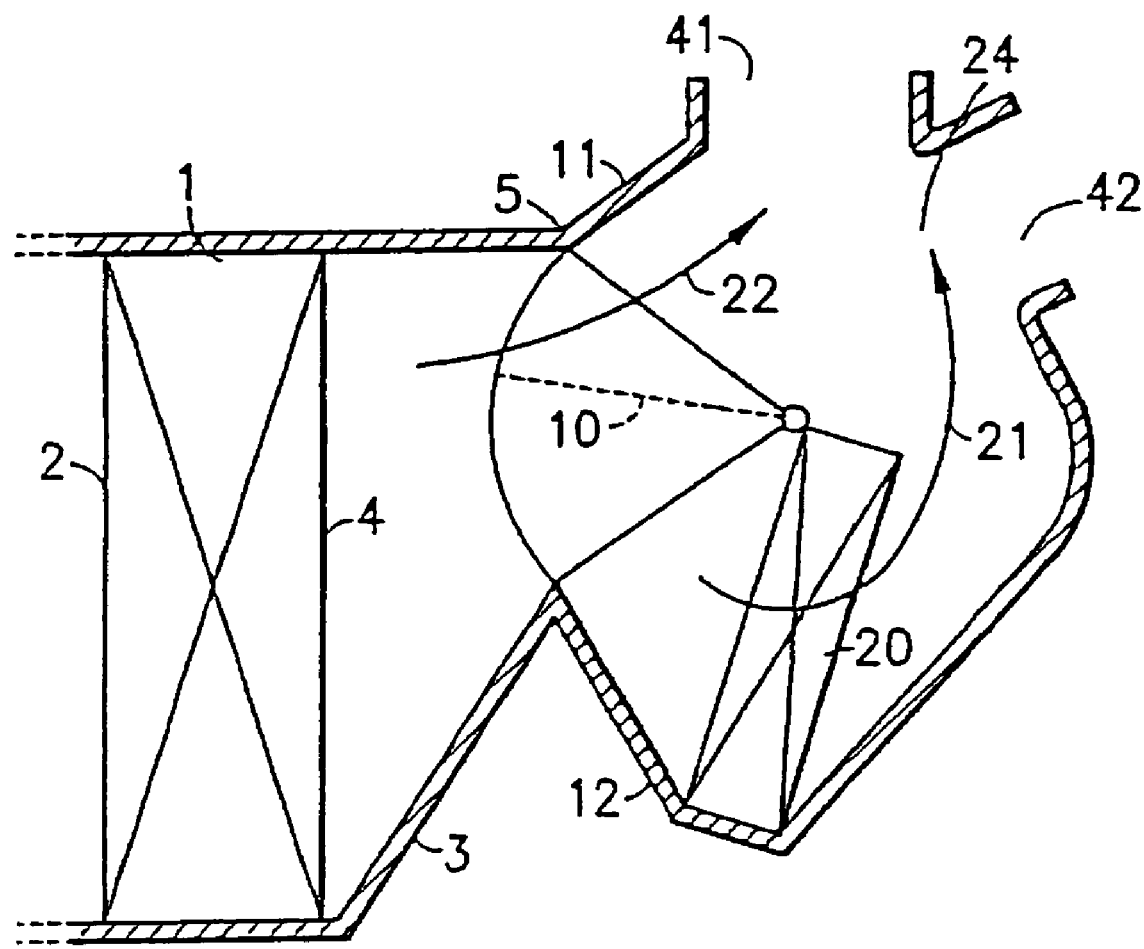
FIG. 1 is an elevational cross sectional view of an exemplary prior art HVAC.

Preferred embodiments of the air distribution module for a vehicle heating, ventilation and air conditioning system, therefore, comprise a housing; a heating means such as a heater core or the like; an evaporator means such as an evaporator or the like; a door; a baffle; a first conduit for a first air flow; a second conduit for a second air flow; an opening between said first and second conduits for merging said first and second airflows in a mixing region. Preferably the door is a blend door. More preferably the door is functionally described as a blend door, and is in the shape of a barrel ('blend barrel door'). In the preferred embodiments of the present invention, the door has within its area formed by it inner surface (the surface where air passes by before being appropriately distributed to the distribution regions) an air mixture structure, (one type thereof herein defined as a baffle), yielding a baffle is located within the door. Even more preferably the door is a barrel door, and, even more preferably, a blend barrel door (blend door with a barrel shape) and the baffle located or incorporated in the door is a cross flow baffle.

In preferred embodiments of the present invention, it has been found that by combining or placing or otherwise locating a specific type of air mixing device (a baffle, or, more specifically, a cross flow baffle) within a blend door, and, preferably, a blend barrel door (blend door of barrel shape), this eliminates many of the problems of the prior art. Firstly, the present invention, by forming an assembly of both the door, and particularly, the blend barrel door, with the air mixing device (baffle, or, preferably, a cross flow baffle), (the 'baffle/blend door assembly') the need for two elements (the air mixing device, and downstream, the blend door) is eliminated. The blend barrel door containing the cross flow baffle, as a baffle/blend door assembly, means that less space is required than would be if they were placed separately in line with one another. Secondly, and surprisingly, the air that comes out of the blend door/baffle assembly, especially when a cross flow baffle is part of the assembly, yields air with the desired characteristics prior to distribution, though counter-intuitively one might think that the fact that some of the air was being 'mixed' within the door would lead to difficulties in insuring that the air's final temperature and volume requirements to the distribution area would be met, prior to the final distribution via mode doors and ducts to the interior of the vehicle. A cross flow baffle specifically provide a geometry while allows entry of air into an area or zone from more than one direction or stream and cross through or flow across each other in a controlled manner, and exit the area or zone with predetermined and/or predictable amount of mixing. Also preferred is wherein the baffle/blend door assembly is downstream of the heater means and the evaporator means.

In even more preferred embodiments of the present invention, the presence of a baffle, and, particularly, a cross flow baffle, within the blend door, and, particularly, in the blend barrel door, have allowed for blend barrel doors that no longer require a shaft or similar device to obtain the stiffness and sealing required. A shaft is no longer required, as in the prior art, to stop the 'pizzas' which are holding the ends of the door from flexing in during assembly, or to improve torsion stiffness.

By providing for a blend barrel door with integrated cross flow baffle, the final result is an increase in overall quietness of the unit, easier manufacturability, and increased overall quality. In the addition, the internal space required is reduced, as the air mixing device and blend door are combined into one assembly or 'unit' thus leading to overall savings. The space of importance in the HVAC, prior to the distribution area of the HVAC unit, that was taken up by an air mixing device prior to a door, is reduced, and, by using a barrel door, the space within the barrel door is occupied by the baffle, and, preferentially, the cross flow baffle, allowing the mixing (cross flow) baffle to be positioned in this space to create a very compact overall design.

In preferred embodiments of the present invention, the cross flow baffle/blend barrel door assembly provides identical, if not better, characteristics, for air arriving at the air distribution area. The cross flow baffle blend/barrel door assembly can be improved to provide increased stiffness by using two generally perpendicular curved surfaces (compounds, surfaces) blended with a variable fillet at the juncture of the wedges or 'pizzas' where the surfaces meet, which support the door ends and the door itself. The compounding of the surfaces and this 'compound curvature' gives tremendous geometrical advantage in the stiffness of the part. In these preferred embodiments of the present invention, this is achieved with no extra parts or any specific new or complex features. In preferred embodiments of the present invention, at least one junction exists on each side of the barrel door at the area of the 'wedges' of the barrel door. Preferred is that the at least two inner surfaces of the barrel door meet as a compound curvature and that the compound curvature is at a juncture with the wedge of the barrel door. Even more preferred is when the compound surfaces or surfaces with at least two distinct planes of curvature are blended together with a fillet. Even more preferred is when the fillet is a variable fillet.

The advantage of the stiffness improvement means easier assembly, quieter flow past the door. It allows the door to have a baffle inside it, where normally a large door width will dissuade the insertion of the baffle in the door. Hence the architecture is more compact.

The area of meeting of two subtly curved or bended surfaces (also referred to a compound curvature or compound surface) minimize stress concentration in the area and hence minimize local strain while stiffness stays high. The variable fillet allows the stresses to be spread throughout the whole region (area plus nearly regions of the door) rather than creation of the classical stress concentration at the edge of the pizzas and the door itself.

Curvature of the primary surface of the door structure needs to be pronounced (i.e. though subtle to the visual eye, apparent from a structural sense) to improve torsion stiffness. Curvature of the 'pizza' (wedge shape) ends of the door or support pieces needs to be pronounced to improve the flexural and or torsion stiffness of the door ends. Both these structures need to be filleted or put together, preferably with a variable fillet, allowing stress to flow without peaks or abrupt changes.

In preferred embodiment of the present invention, by utilizing the geometry available, even subtle changes in the curvature from previous or prior art planar type doors allows for a sturdier baffle/blend door assembly in the HVAC module.

Referring to FIG. 1, there are a number of air outlets into the vehicle cabin and these outlets are connected to the air duct by a corresponding number of output ducts (two such ducts are shown in FIG. 1). A first upper duct 41 is disposed on the side of the system which will tend to provide cold air and the second lower duct 42 is disposed on the side of the system which will tend to provide hot air. Referring first to FIG. 1, an evaporator unit 1 has an input side 2. Air is urged into the input side 2 of the evaporator 1 by the movement of a vehicle in which the air conditioning system is mounted, or by a fan (not shown). The evaporator 1 is disposed in an air duct 3 and the evaporator has an output side 4 from which emerges cooled air. The output duct 3 extends to a throat portion 5 which co-operates with a blend door 10. The blend door as shown in FIG. 1 is in a central position so defining, with one wall of 11 of the duct 3 a first conduit for cold air flow and, defining with the opposite wall 12 of the duct 3 a second conduit for air which will be heated. The second conduit leads to a heat exchanger core 20 which is supplied with hot water, for example from the engine of the vehicle, and which has an output side from which emerges a flow 21 of heated air. The flow 21 of heated air and a cool air flow 22 from the first conduit come together in a mixing region 24 of the duct 3. Two distribution ducts, 41 and 42 are shown in FIG. 1 and these, as has previously been discussed supply air outlets in different parts of the vehicle cabin, e.g. passenger and driver's sides.

It would be understood by one skilled in the art that although some mixing of the hot and cold air flows will take place in the mixing region 24, nonetheless the flow resistance caused by the heat exchanger core 20 will substantially reduce the velocity of the hot air and, as a result, on the extreme left of the duct 3, as seen in the direction of flow, the cold air will predominate and, on the extreme right of the duct 3 as seen in the direction of flow, hot air will dominate. Thus distribution duct 41 is more likely to contain cool air and distribution duct 42 is more likely to carry warm air.

Figure 2:
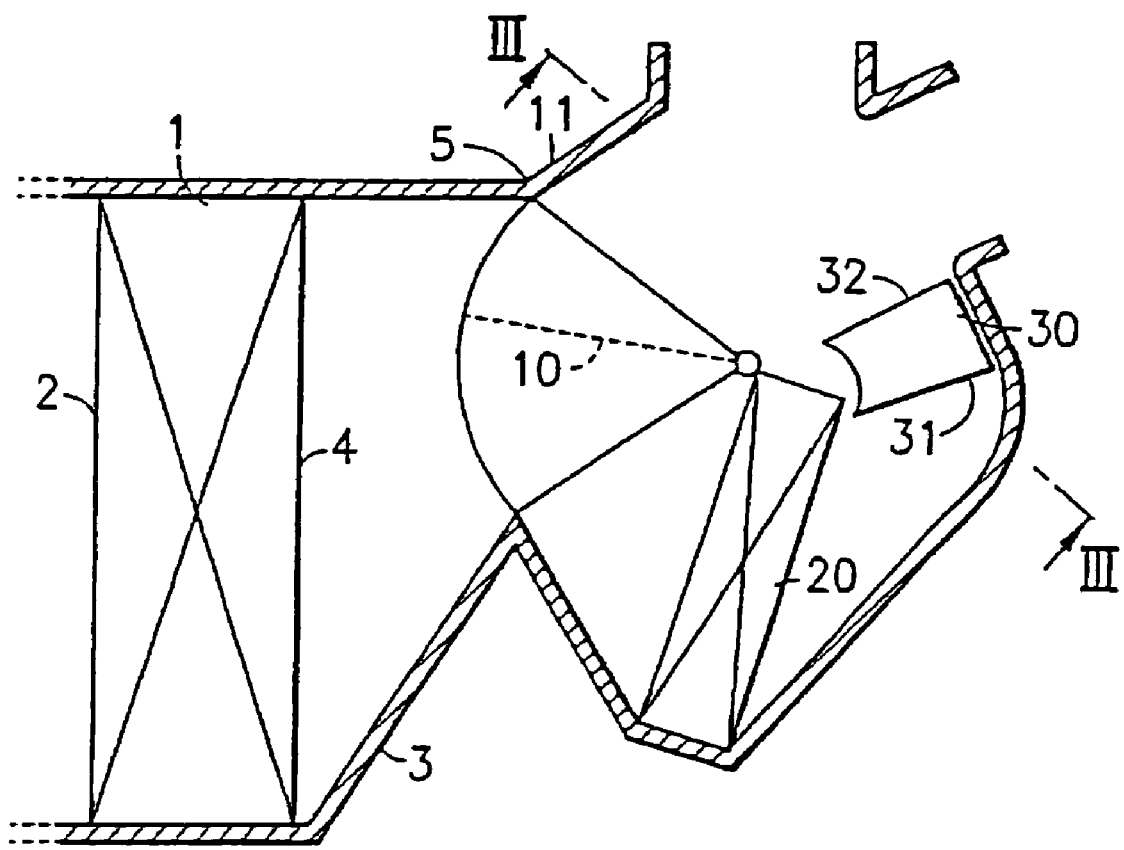
FIG. 2 is an elevational cross sectional view of another exemplary prior art HVAC.

In FIG. 2 is illustrated an HVAC system an air flow mixer structure 30 is provided in the second conduit of the air conditioning system, on the downstream side of the heater core. The air flow mixer structure has an inlet side 31, which is supplied in use with hot air from the heater core and has an outlet side 32.

Figure 3:
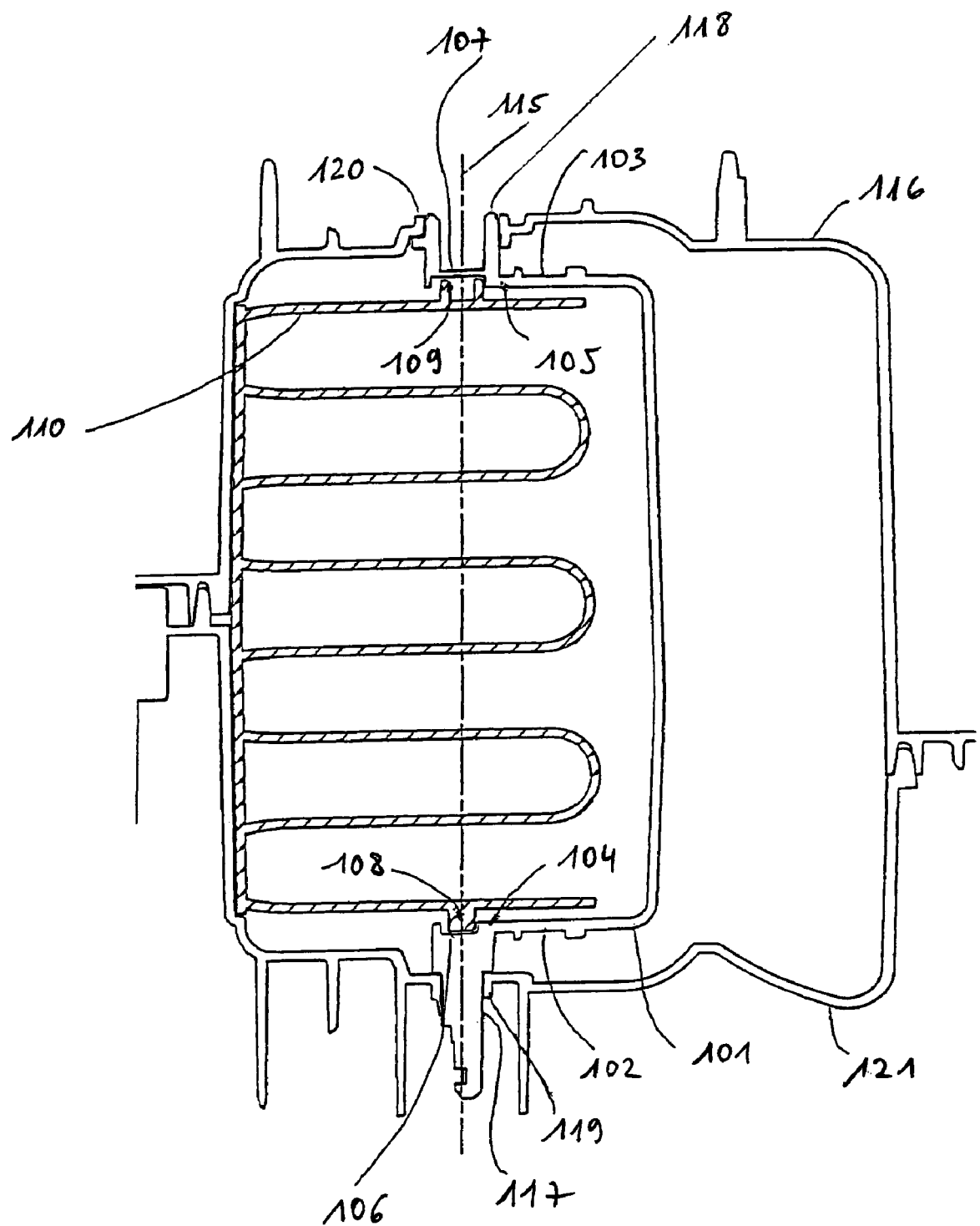
FIG. 3 is an elevational cross sectional view of an exemplary HVAC in accordance with an aspect of the present invention.
Figure 4:
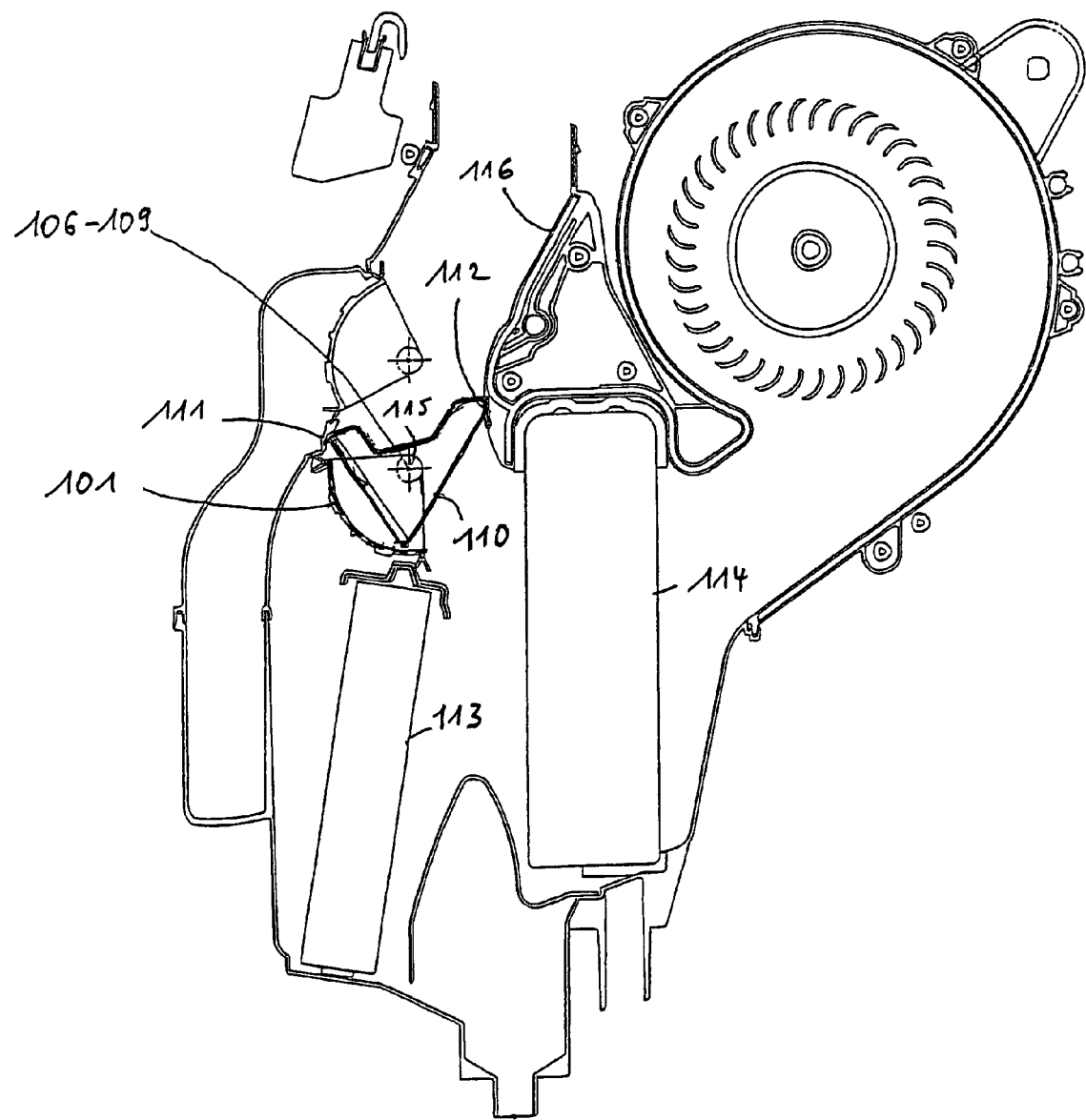
FIG. 4 is a cross sectional view of another exemplary HVAC in accordance with an aspect of the present invention.

In FIGS. 3 and 4, there is illustrated a barrel door 101, essentially in is the shape of a 'slice' of a hollow cylinder closed on both ends 102, 103. The inside surface of each of the 'triangular' sides 104, 105 has slots 106, 107. The slots 106, 107 end in semi-circular shape and accept a pin 108, 109, and, in particular, a rounded or round pin, designed into the air mixer structure 110 or baffle. The slots locate the baffle with respect to the barrel door.

Figure 5:
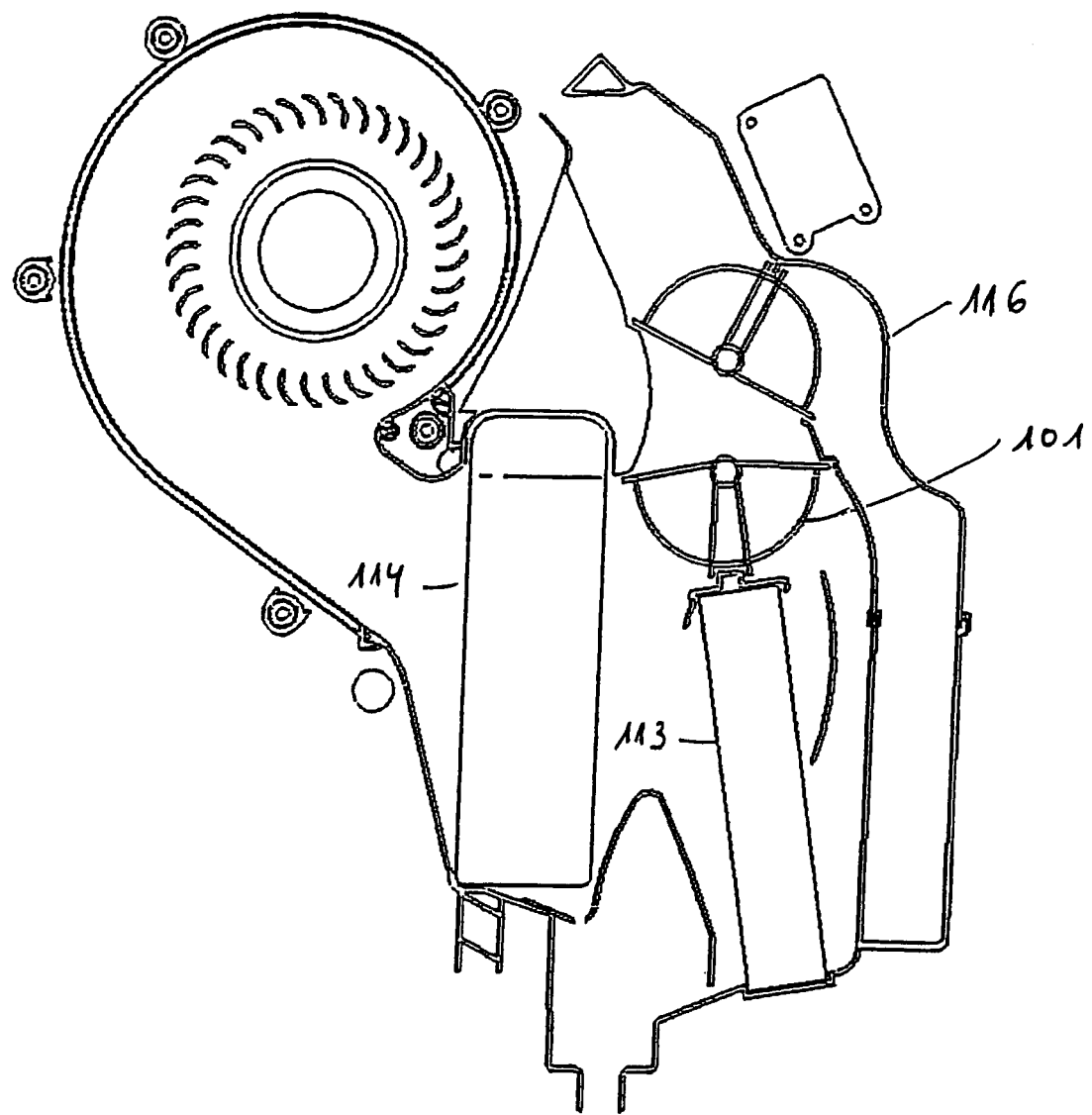
FIG. 5 is a cross sectional view of an exemplary HVAC in accordance with an aspect of the present invention.

In FIGS. 4 and 5, there is illustrated a barrel door 101 and baffle assembly 110. The assembly is inserted into one side of the housing of the HVAC unit, preferably in a direction parallel to the axis of the barrel door. The housing engages or 'traps' the baffle into the slots in the barrel door by means of contacting surfaces 111, 112 between the baffle and the housing. The contacting surfaces 111, 112 are essentially in a plane parallel to the axis of the barrel door, but normal to the direction of the slot in the baffle. The envisioned structure is that the barrel door 101 would be located downstream of the heater core 113 and evaporator 114 and would move between air passages for hot air from the heater core 113 and cold air from the evaporator 114. The axis 115 of the door 101 would be downstream of the passages that are blocked by the door. The baffle 110 would fit into the door, in the space between the triangular sides of the barrel. The baffle 110 would attach to the housing 116 by means of sliding into housing surfaces 111, 112 located downstream of the passages that are blocked by the door.

Preferably, the barrel door axis 115 is designed with a pin 117 that fits into a hole 119 in the housing. This locates the door, preventing movement in the plane of the slot on the door.

The opposite side of the housing is then placed over the barrel door/baffle to mate with the first side of the housing. This housing also has contacting surfaces to the baffle as described on the first housing. A second pin 118 on the axis of the barrel door fits into a hole 120 on the second housing 121, locating the barrel door along its axis.

In the preferred embodiments, the air mixer baffle is restricted or constrained, more preferably restricted or constrained in all directions and allows the blend barrel door to rotate about its axis.

The air mixer baffle is preferably designed so that it does not interfere with the motion of the barrel door.

The simplified HVAC unit provides a baffle/blend door assembly comprising an air mixer structure wherein the attachment means of baffle and barrel door is such that it provides for ease of assembly.

Figure 6A:
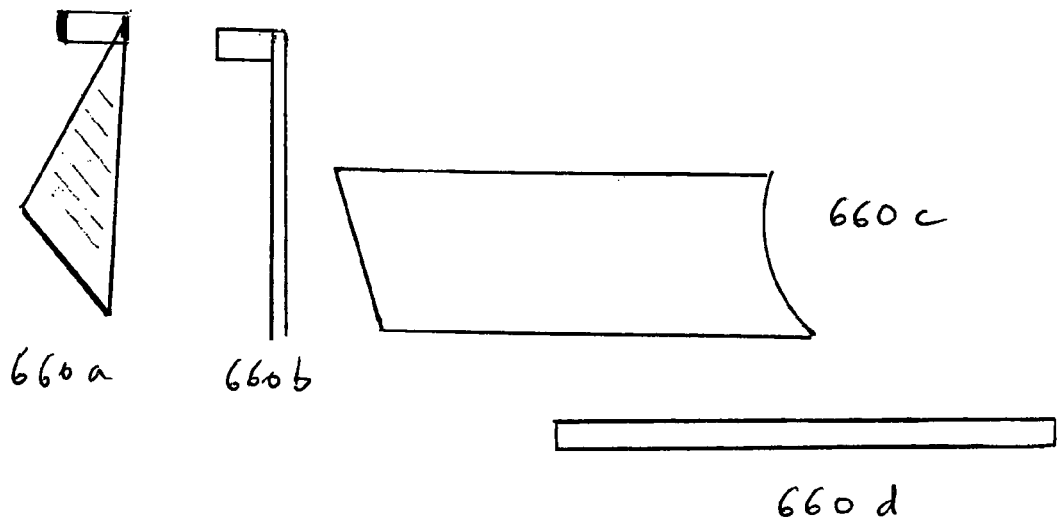
FIG. 6a is a representation of a flat 'pizza' door from isometric and side views as found in the prior art.

FIG. 6a shows prior art flat pizza door in isometric (660a, 660c) and side (660b, 660d) views.

Figure 6B:
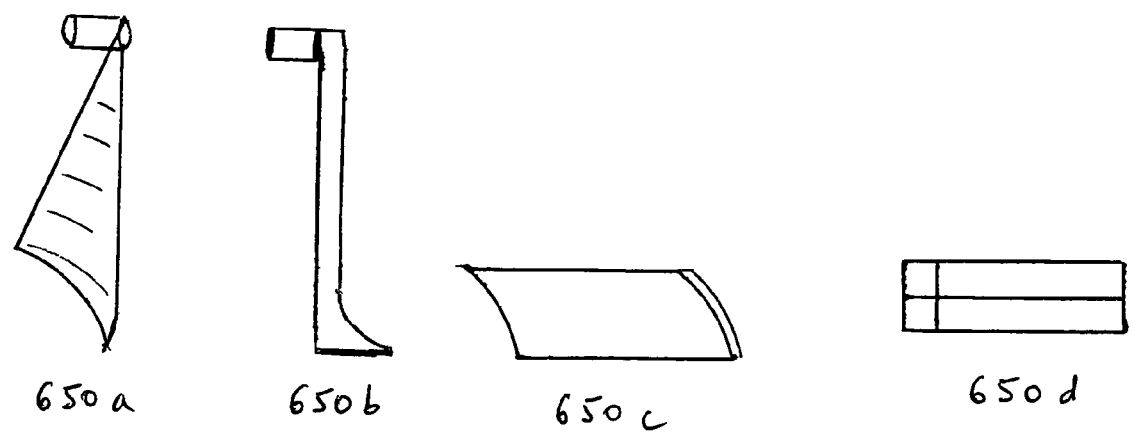
FIG. 6b is a representation of compound curvature 'pizza' door from isometric and side views in accordance with an aspect of the present invention.

FIG. 6b shows compound curved pizza door of the present invention in isometric (650a, 650c) and side (650b, 650d) views, showing curvature.

Figure 7A:
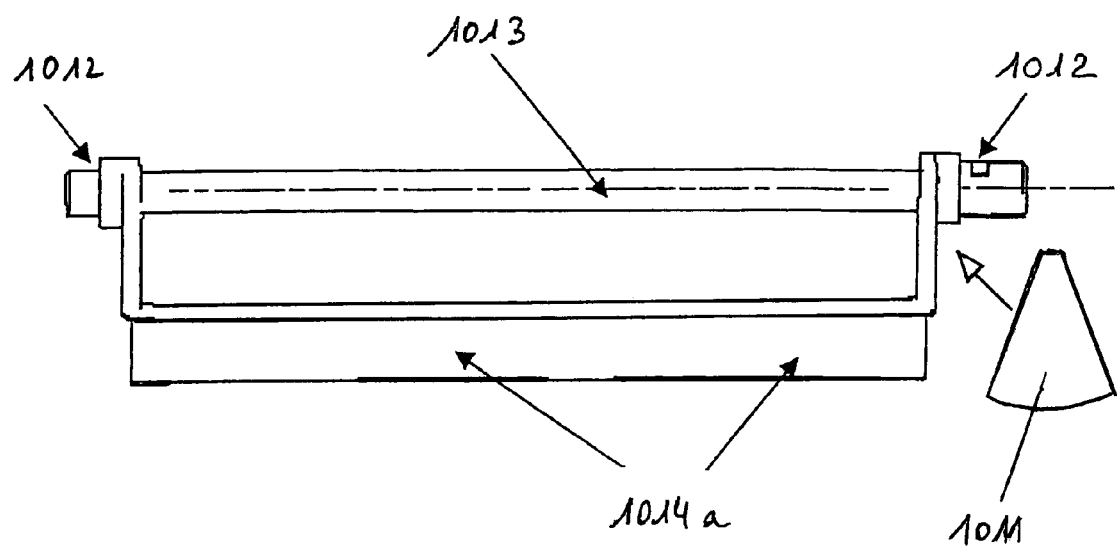
FIGS. 7a and 7b are a prior art barrel door without baffle, used in the prior art, with high stress region shown.

Referring to FIG. 7a, a flat barrel door 1014(a) with ends or bearings 1012 is illustrated, the side view 1011 showing the pizza shape and torsion shaft with end support 1013 illustrated.

Figure 7B:
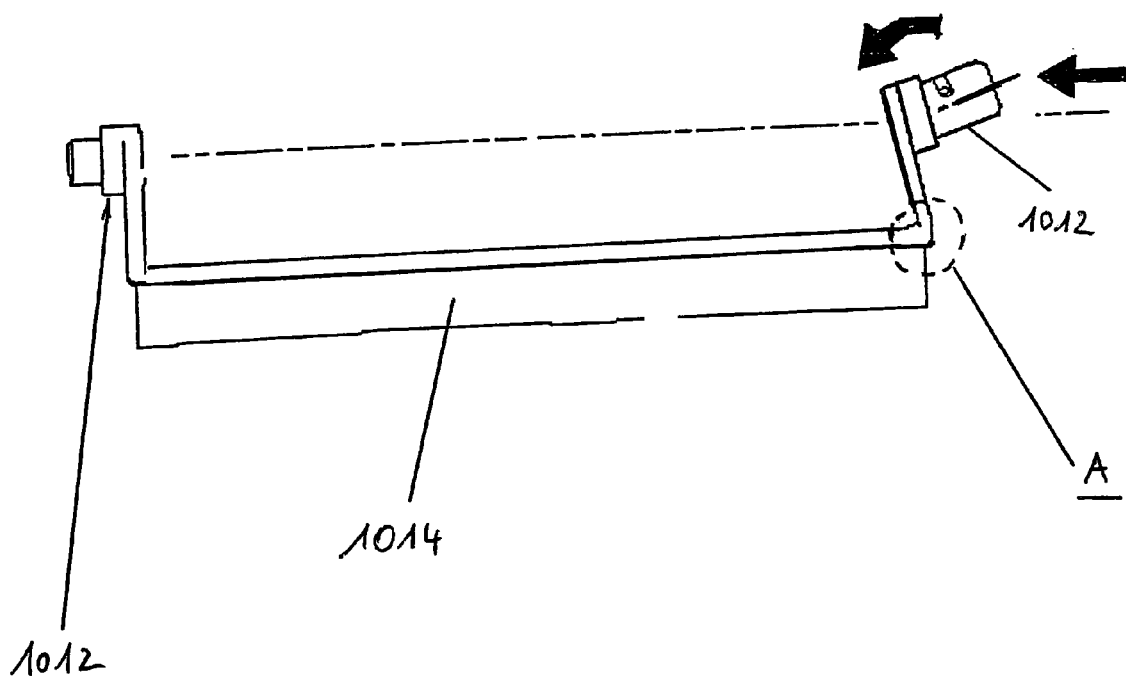

Referring to FIG. 7b, flat barrel door without shaft 1014b is shown, with ends of door 1012, and area of high stress A illustrated.

Figure 8:
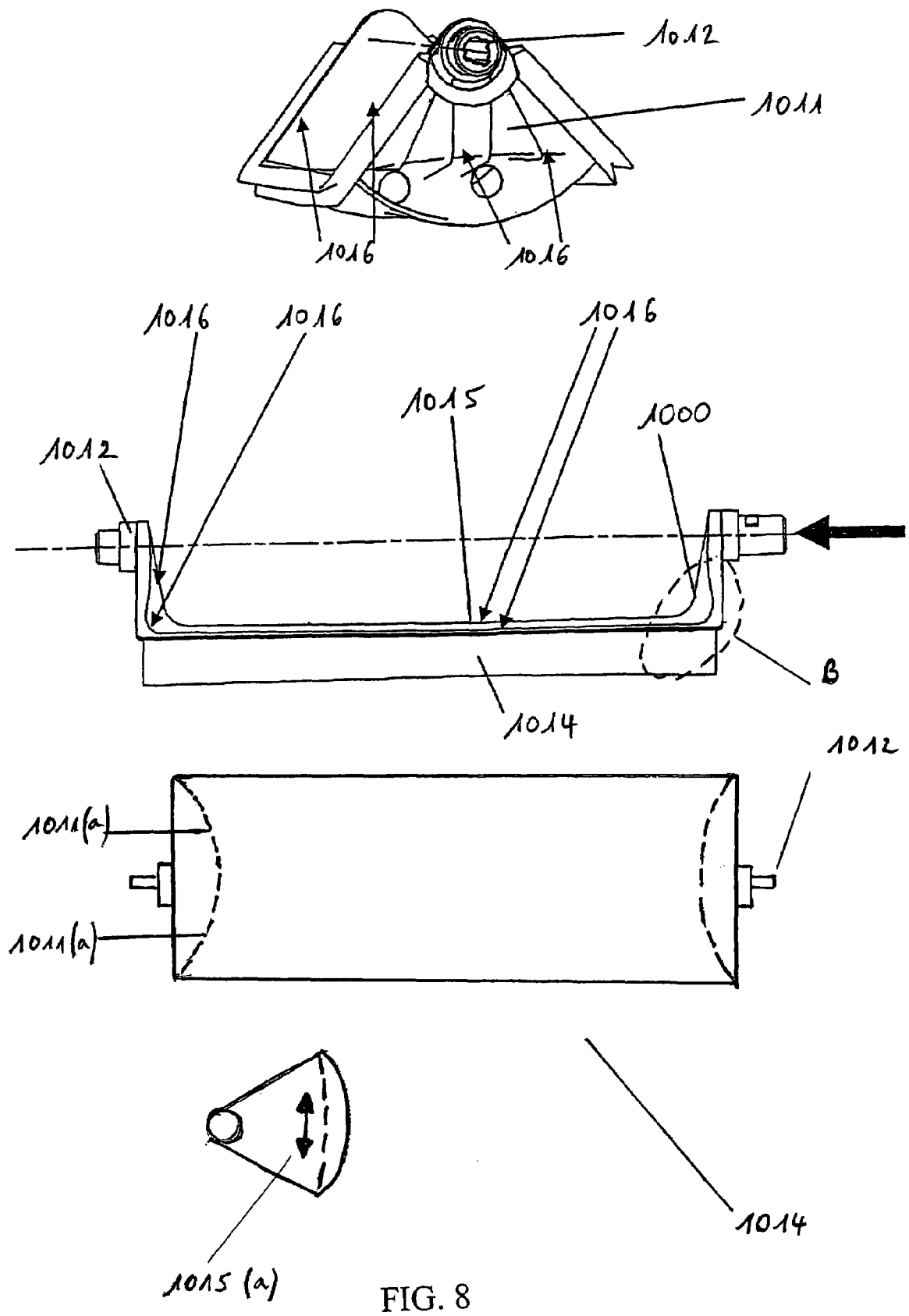
FIG. 8 is a blend barrel door, having compound curvature, showing pizza end piece and fixed or variable fillet and the curvature functions, in accordance with an aspect of the present invention.

FIG. 8 illustrates fixed or variable area or fillet 1000 and inner surface of the barrel door 1015 showing slight curvature 1016 in the door 1014 and compound curvature in the 'pizza' shaped end 1016. Shared stress area B leads to additional strength and stability.

Figure 9:
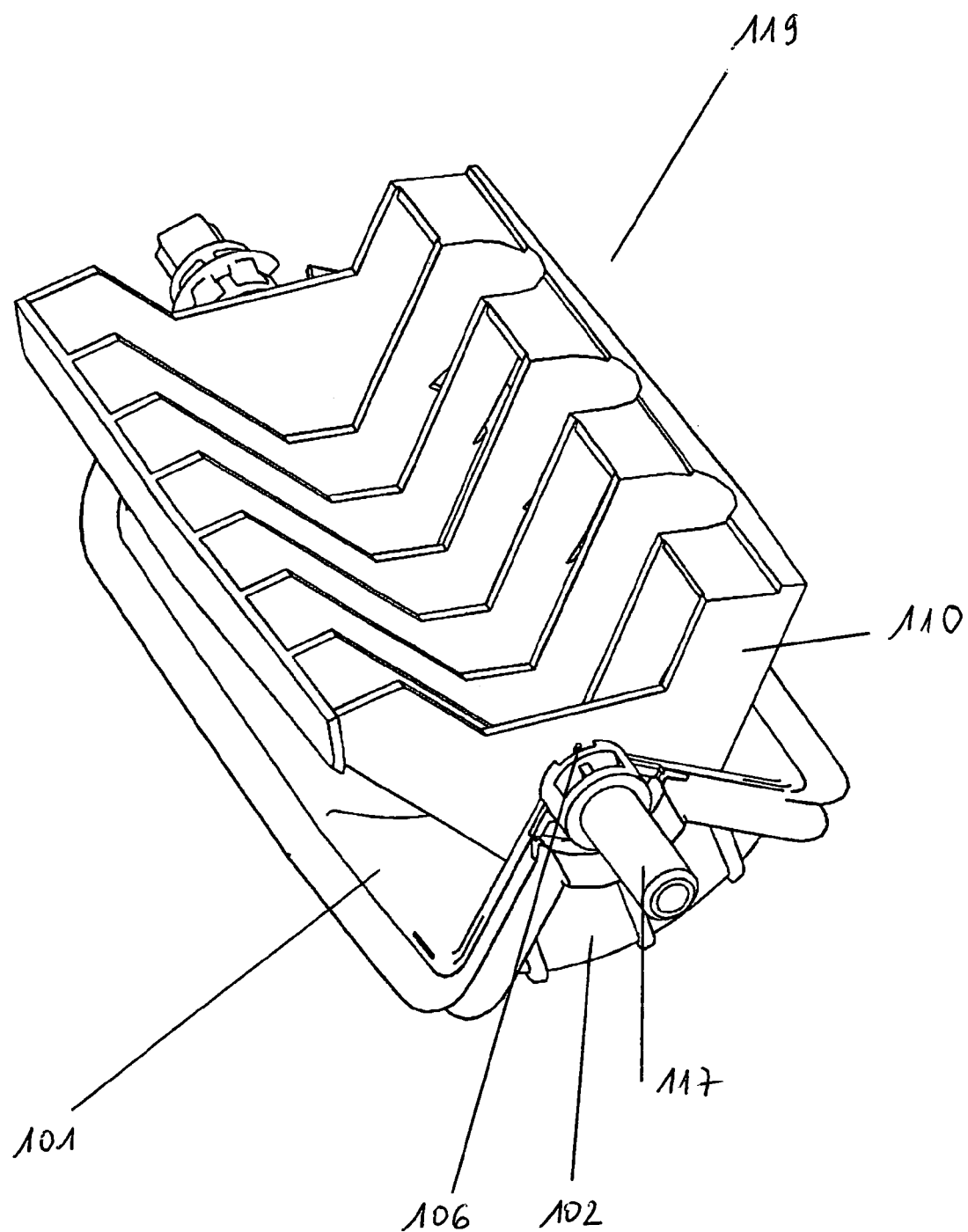
FIGS. 9 and 10 are different elevational views of blend/baffle assemblies, with cross flow baffle and blend barrel door components illustrated.
Figure 10:
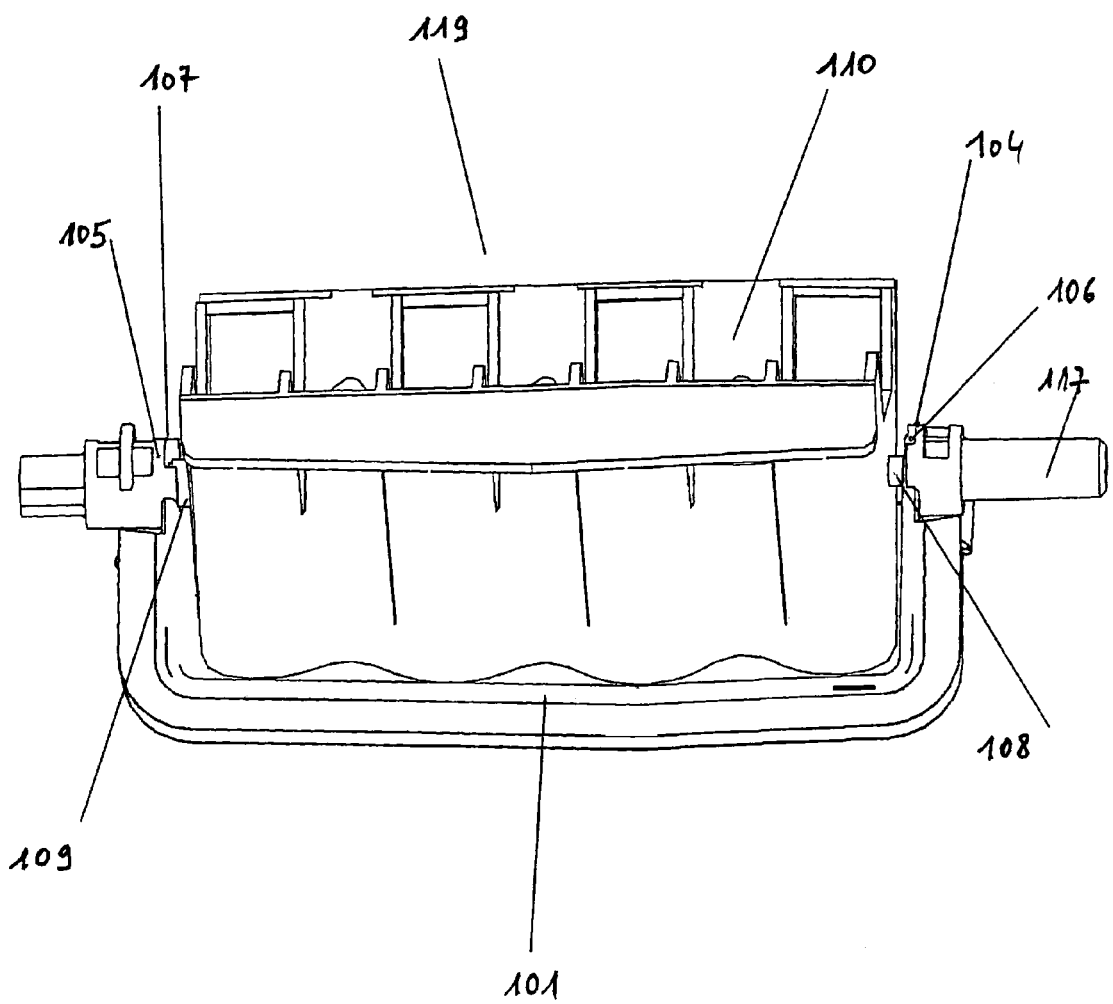

FIGS. 9 and 10 show air mixture structure 110 and barrel door 101 as part of baffle/barrel door assembly 119. In FIGS. 9 and 10, there is illustrated a baffle/barrel door assembly 119 with barrel door 101, essentially in the shape of a 'slice' of a hollow cylinder 102 closed on both ends. The inside surface of each of the 'triangular' sides 104, 105 has slots 106, 107. The slots 106, 107 end in semi-circular shape and accept a pin 108, 109, and, in particular, a rounded or round pin, designed into the air mixer structure 110 or baffle. The slots locate the baffle with respect to the barrel door. Preferably, the barrel door axis is designed with a pin 117 that fits into a hole in the housing. This locates the door, preventing movement in the plane of the slot on the door. Therefore, the baffle/blend door assembly is able to be assembled into the housing by sliding the assembly therein.

As described above, in preferred embodiments of the present invention, the baffle/blend door assembly preferably comprises a barrel door. Also, in preferred embodiments of the present invention, the baffle/blend door assembly comprises a cross flow baffle. Most preferably, the baffle/blend door assembly is a cross flow baffle/blend barrel door, i.e. it comprises a cross flow baffle located inside of a blend barrel door.

In the embodiments of the present invention, the baffle, in addition to being found in the door, and, preferably, the barrel door, is attached or functionally fitted into the housing. In more preferred embodiments, the baffle/blend door assembly comprises an attachment means of baffle and barrel door wherein the assembly can be attached to the housing by means of sliding.

In most preferred embodiments of the present invention, a baffle/blend barrel door assembly for use in a vehicle heating, ventilation and/or air conditioning system is found that comprises a blend barrel door with at least two curved inner surfaces, and a cross flow baffle, wherein the cross flow baffle is integrated into the blend barrel door and wherein at least two curved inner surfaces form a compound curvature.

The attachment means of baffle and barrel door is such that it provides for ease of assembly. The baffle/barrel door assembly provides for smaller packaging volume with the same functionality as larger HVAC units.

The preferred embodiment of the present invention has been disclosed. A person of ordinary skill in the art would realize, however, that certain modifications would come within the teachings of this invention. Therefore, the following claims should be studied to determine the true scope and content of the invention.

The invention claimed is:

1. An air distribution module for a vehicle heating, ventilation and air conditioning system, comprising:
    a housing;
    a heating means;
    an evaporator means;
    a barrel door including a slot defined in each end thereof;
    a cross flow baffle;
    a first conduit for a first air flow comprising a hot air path upstream of the cross flow baffle;
    a second conduit for a second air flow comprising a cold air path upstream of the cross flow baffle; and
    an opening between said first and second conduits forming a mixing region where the first and second airflows merge, said mixing region comprising the hot air path and the cold air path, said mixing region having the barrel door and the cross flow baffle;
    the cross flow baffle being a mixer structure having an air inlet region and an air outlet region, each of which are in fluid communication with said mixing region, said mixer structure including a plurality of air passages disposed between said inlet region and said outlet region, for dividing an air flow at said inlet region into a plurality of air flows into the mixing region, the cross flow baffle including a pin;
    wherein the cross flow baffle is attached to the housing and is located within the barrel door, the barrel door being attached to the housing by at least one pin rotatably attached to the housing;
    wherein the barrel door is rotatable independently from the cross flow baffle about the at least one pin;
    and wherein the slot defined in each end of the barrel door is configured to accept the pin of the cross flow baffle, the slot being configured to locate the cross flow baffle with the barrel door.

2. The air distribution module as in claim 1 wherein at least two inner surfaces of the barrel door meet as a compound curvature.

3. The air distribution module as in claim 2 wherein the compound curvature occurs at a juncture of the wedge of the barrel door.

4. The air distribution module as in claim 3 wherein the surfaces forming the compound curvature are blended together with a fillet.

5. The air distribution module as in claim 4 wherein the fillet is a variable fillet.

6. An air distribution module for a vehicle heating, ventilation and air conditioning system, comprising:
    an HVAC unit, having:
        a housing;
        a heating means;
        an evaporator means;
        a cross flow baffle/barrel door assembly, the barrel door including a slot defined at each end thereof;
        a first conduit for a first air flow flowing downstream from the heating means;
        a second conduit for a second air flow flowing downstream from the evaporator means;
        an opening between the first and second conduits for merging the first and second airflows in a mixing region downstream of the first and second conduits;
        wherein the cross flow baffle/barrel door assembly is found in the mixing region downstream of the heater means and the evaporator means;

the cross flow baffle being a mixer structure having an air inlet region and an air outlet region, each of which are in fluid communication with said mixing region, said mixer structure including a plurality of air passages disposed between said inlet region and said outlet region, for dividing an air flow at said inlet region into a plurality of air flows into the mixing region, the cross flow baffle including a pin;

and wherein the cross flow baffle is attached to the housing and is located within the barrel door, the barrel door being attached to the housing by at least one pin rotatably attached to the housing;

further wherein the barrel door is rotatable independently from the cross flow baffle about the at least one pin;

and also wherein the slot defined in each end of the barrel door is configured to accept the pin of the cross flow baffle, the slot being configured to locate the cross flow baffle with the barrel door;

wherein the cross flow baffle of the cross flow baffle/barrel door assembly mixes air that comes into the assembly prior to coming out of the assembly for distribution to ducts leading outside of the HVAC unit.

7. The air distribution module for a vehicle heating, ventilation and air conditioning system according to claim 6 wherein the at least one pin is attached to the housing by means of sliding.

8. The air distribution module as in claim 6 wherein at least two inner surfaces of the barrel door meet as a compound curvature.

9. The air distribution module as in claim 8 wherein the compound curvature occurs at a juncture of the wedge of the barrel door.

10. The air distribution module as in claim 9 wherein the surfaces forming the compound curvature are blended with fillet.

11. The air distribution module as in claim 10 wherein the fillet is a variable fillet.

12. An air distribution module for a vehicle heating, ventilation and air conditioning system, comprising:

an HVAC unit having at least one hot air duct downstream of a heater core and at least one cold air duct downstream of an evaporator; and a mixing area within the HVAC unit upstream of the hot air duct and the cold air duct, the mixing area comprising a cross flow baffle/blend barrel door assembly, the cross flow baffle/blend barrel door assembly comprising:

a blend barrel door with at least two curved inner surfaces and a slot defined in each end thereof; and a cross flow baffle having at least one area or zone within the cross flow baffle, wherein the cross flow baffle is integrated into the blend barrel door such that air flowing into the baffle is mixed in the at least one zone prior to leaving the baffle, the cross flow baffle including a pin;

the cross flow baffle being a mixer structure having an air inlet region and an air outlet region, each of which are in fluid communication with said mixing area, said mixer structure including a plurality of air passages disposed between said inlet region and said outlet region, for dividing an air flow at said inlet region into a plurality of air flows into the mixing area;

wherein the cross flow baffle is attached to a housing and is located within the blend barrel door, the blend barrel door being attached to the housing by at least one pin rotatably attached to the housing;

wherein the blend barrel door is rotatable independently from the cross baffle about the at least one pin;

and further wherein the slot defined in each end of the barrel door is configured to accept the pin of the cross flow baffle, the slot being configured to locate the cross flow baffle with the barrel door.

13. The air distribution module for a vehicle heating, ventilation and air conditioning system as in claim 12 wherein the air flowing into the baffle enters the at least one area zone within the blend barrel door assembly such that air enters from more than one stream into the cross flow baffle, and the more than one streams cross through or flow across each other prior to exiting the at least one area or zone with a predetermined amount of mixing.

\* \* \* \* \*